US006892301B1

United States Patent
Hansmann et al.

(10) Patent No.: US 6,892,301 B1
(45) Date of Patent: May 10, 2005

(54) METHOD AND SYSTEM FOR SECURELY HANDLING INFORMATION BETWEEN TWO INFORMATION PROCESSING DEVICES

(75) Inventors: Uwe Hansmann, Altdorf (DE); Frank Seliger, Hildrizhausen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/398,876

(22) Filed: Sep. 20, 1999

(30) Foreign Application Priority Data

Jan. 12, 1999 (EP) .......................................... 99100474

(51) Int. Cl.⁷ ............................. H04L 9/12; G06F 12/14
(52) U.S. Cl. ........................ 713/172; 713/159; 713/185; 713/186; 713/193
(58) Field of Search ................................. 713/150, 155, 713/156, 159, 168, 171–173, 185, 186, 193

(56) References Cited

U.S. PATENT DOCUMENTS

| 5,689,565 A |   | 11/1997 | Spies et al. ................... 380/25 |
| 5,757,918 A | * | 5/1998 | Hopkins ....................... 235/379 |
| 5,781,723 A | * | 7/1998 | Yee et al. ..................... 731/159 |
| 6,031,910 A | * | 2/2000 | Deindl et al. ................. 380/255 |

FOREIGN PATENT DOCUMENTS

| DE | 197 08 616 A1 |   | 9/1998 | ........... G06F/12/14 |
| EP | 0 715 242 A1 | * | 6/1995 | ............. G06F/1/00 |
| JP | 02-041051 |   | 2/1990 | |
| JP | 06-187511 |   | 7/1994 | |
| JP | 09-73415 |   | 3/1997 | |
| WO | WO 98/03904 | * | 1/1998 | ............. G06F/1/00 |

OTHER PUBLICATIONS

E. Okamoto, "Introduction to Code Theory", Japan, Kyoritsu Shuppan Co., Ltd. Feb. 25, 1993; p. 110; and.
N. Ikeno an dK. Koyama, "Modern Code Theory", Japan, Journal of the Institute of Electronics, Information and Communication Engineers, May 20, 1989; pp. 223–225.

* cited by examiner

Primary Examiner—Justin T. Darrow
(74) Attorney, Agent, or Firm—Scully, Scott, Murphy & Presser (57) ABSTRACT

Described is a mechanism for securely handling an information unit by a first information processing device (2), for instance a terminal device like a chip card reader, which interoperates with a second secure information processing device (1), for instance a portable device like a chip card, whereby the information unit is provided by an issuer. The information unit is provided from the issuer to the first device and encrypted by using a first key. The first key is also encrypted by using a second key. The second key is provided on the second secure device (1) and interconnecting the first and the second device enables to decrypt the first key by using the second key and then to decrypt the information unit by using the first key.

32 Claims, 3 Drawing Sheets

FIG. 1

METHOD AND SYSTEM FOR SECURELY HANDLING INFORMATION BETWEEN TWO INFORMATION PROCESSING DEVICES

BACKGROUND OF THE INVENTION

1. Technical Field

The present invention generally relates to secure interoperation between two information processing devices where only one of these devices can handle information in a secure manner. In particular, the present invention relates to a method and a system for securely handling an information unit by a first information processing device, for instance a terminal device, interoperating with a second secure information processing device, for instance a portable device like a chip card, whereby the information unit is provided by an issuer.

2. Prior Art

It is commonly known that chip cards are not only utilized as a memory for storing data on it but also used as an access control medium or a medium to enable and perform encryption and decryption of information. Therefore, from the beginning of development of chip cards, the field of cryptology has played a central or even dominant role. Meanwhile, the scientific results of this development field are inseparably related to chip card technology.

The technical field of cryptology divides into two fields of activity, namely cryptography and cryptoanalysis, The field of cryptography embraces the science and methodology of encryption and decryption of information.

The science of cryptoanalysis addresses to crack existing cryptographic systems.

In the field of chip card technology, another major issue is practicability of the scientific and theoretical aspects of cryptology.

The predominant objective of cryptology is, on the one hand, secrecy of information and, on the other hand, securing or safeguarding the authentication of information. Both objectives are independently of each other and thus have different requirements of the respective information system. 'Secrecy' means that only the addressed receiver is able to decrypt the contents of a message. In contrast to that, 'authenticity' enables the receiver of the message to secure that the received message has not been altered during transmission.

For the following description of known techniques of data encryption/decryption it is referred to chapter 4 of the "Handbuch der Chipkarten", W. Rankl, W. Effing, 1996, Hauser Verlag, Munich-Vienna, which contents are regarded to be fully incorporated herein. Each encryption technique uses three types of information. Non-encrypted data are designated as "plain text" wherein encrypted data are designated as "cypher text". For encryption/decryption one or more keys are required as third type of data. All these types of data are to be processed by an encryption algorithm. Cryptographic algorithms currently used in chip cards are generally block-oriented, which means that the plain text and the cypher text are always processed as packages of a given length, e.g. 8 byte in case of the algorithm used by the decryption/encryption standard (DES) which is discussed in more detail in the following.

It is emphasized hereby that the present invention is applicable to all described fields of cryptography like encryption, decryption, or one-way cryptographic functions like hash values or digital signature verification mechanism. Modern cryptographic algorithms are generally based on the known Kerckhoff principle which says that the entire security of an algorithm shall only depend on secrecy of the underlying keys, but not on secrecy of the cryptography algorithm itself.

Besides Kerckhoff, a further known principle is security through masking which presumes that a fictitious attacker does not know how the system works. But the latter principle is by no means sufficient to secure an information handling system. The security of modern and already published cryptographic algorithms does, in practice, only depend on the performance of the computers used to crack a cryptographic algorithm and thus an alleged additional masking technique of the utilized methodology of cryption one achieves a considerably increased protection against attacks. Otherwise, the rapidly progressing development of computer performance causes a doubling of performance within about one and a half years and thereupon the increasing number of participants of the worldwide computer network, e.g. the WEB, provide a further way to perform serious attacks on cryptographic systems or related keys.

In order to crack a cryptographic algorithm, there are different ways of attacks. A first one is the "cypher text only attack" where the attacker does only know the cypher text and tries to obtain the key or plain text by use of this information. A more promising attack is the so-called "known plain text attack" where the attacker is in the possession of a number of plain-text/cypher-text pairs for a secret key. The secret key can be obtained by trial and error. The most trivial attack is to find out the secret key only through trial and error which is called "brute force attack". By using a large performance computer, on the basis of a known plain-text/cypher-text pair, all feasible encryption keys are tried until the right one is obtained. The teaching of statistics says that on an average only the half of all possible keys has to be checked in order to find the right one. For that reason, a large space of possible keys renders that kind of attack more difficult.

Cryptographic algorithms are further divided into symmetric and asymmetric algorithms, dependent on the respectively utilized key. 'Symmetric' means that algorithm for en- and decryption is using the same key.

In contrast to that, 'asymmetric' cryptographic algorithms, like that proposed by Whitfield Deffie and Martin E. Hellman in 1976, are using different keys for encryption and decryption. The two major principles for a well performing encryption algorithm are the principles of 'confusion' and 'diffusion' after C. Shannon. It is emphasized that both types of algorithms can be taken as a basis for the present invention.

Symmetric cryptographic algorithms are based on the principle of utilizing the same key for both encryption and decryption. A well-known data encryption algorithm called 'Data Encryption Algorithm' (DEA) has been proposed by the applicant of the present application together with the U.S. National Bureau of Standards developed in 1977. This standard algorithm is often be referred to as 'Data Encryption Standard' (DES). Since that algorithm is designed in consideration of Kerckhoff's dogma, it could be published without any impact on its security. For the details of that algorithm it is further referred to National Institute of Standards and Technology (NIST), FIPS Publication 46-2, "Data Encryption Standard", December 1993.

The principle of 'confusion' means that the statistics of the cypher text shall influence the statistics of the plain text so that an attacker can not take profit by that. The second principle "diffusion" means that every bit of the plain text and of the key shall influence as much bits of the cypher text as possible.

The DEA is a symmetric encryption algorithm using block architecture. It does not perform expansion of the cypher text which means that plain text and cypher text are of identical length. The block length is 64 bit (=8 byte), the key is also 64 bit long but includes 8 parity bits whereby the available space of possible keys is considerably reduced which is in case of DES $2^{56}=7.2\times10^{16}$ possible keys. But in view of the continuously and permanently increasing computer performance such a space of possible keys is regarded as the lower limit for the required security of a cryptographic algorithm.

As an exemplary asymmetric cryptographic algorithm, it is referred to the one proposed by Whitfield Deffie and Martin E. Hellman, published in 1976, which is based on two different keys. One of these keys is public, the other is secret. An information or message is encrypted by using the public key prior to transmission of an information and only the owner of the secret key is enabled to decrypt again the encrypted message. In particular, that principle for the first time enables implementation of a digital signature which in principle can be verified by everyone who is in the possession of the required (public) key. Examplarily, it is referred to a first implementation of the prementioned principle for asymmetric cryptographic algorithms, namely the 'RSA' algorithm proposed by Ronald L. Revest, Adi Shamir and Leonard Adleman which is the currently best known and most versatile asymmetric cryptographic algorithm. Its functional principle is based on the arithmetic of big integer numbers. Both keys are generated based on two big prime numbers. Encryption and decryption can be mathematically expressed by a modulo function, namely in case of encryption $y=x^e$ mod n, for decryption $x=y^d$ mod n with $n=p\times q$ wherein x=plain text, y=cypher text, e=public key, d=secret key, n=public modulus and p, q=secret prime numbers.

For the further details of an implementation of the RSA algorithm it is accordingly referred to R. L. Rivest, A. Shamir, and L. M. Adleman "A Method for obtaining Digital Signatures and Public-Key Cryptosystems", Communications of the ACM, 21(2), pages 120–126, February 1978.

In addition to secrecy of information, another paradigma for encryption algorithms is 'authenticity' of a received message of information. As mentioned above, authenticity means that a message is not altered e.g. not manipulated.

For that purpose, to the actual message a message authentication code is appended and both pats are transmitted to the receiver. The receiver is enabled to calculate its own message authentication code (MAC) and compares that code with the received code. In case of both matching, it is secured that the transmitted message has not been altered during transmission. For generating a MAC, a cryptographic algorithm with one secret key which is known to both communication partners is utilized. For the calculation of a MAC in principle every cryptographic algorithm can be used, but in practice, the above mentioned DEA algorithm is utilized nearly exclusively.

A particular scenario for the present invention is a situation where a chip card is inserted in a chip card acceptance device—in the following called "terminal device"—which does not yet have a support module capable of accessing the card or to fulfill a particular function of the chip card on the terminal. Therefore it is required to obtain the missing software component from an other source of information e.g. to download such required module from a central server connected to the internet. It is noted that the terminal device can either be a computer, like a personal computer or network computer with a chip card reader/writer hardware, or a specialized device combining the chip card reader/writer hardware with an embedded computer.

The transmission will often take place over a network that is open to attacks. It is known that the chip card hereby ensures that the software component in the device accessing the chip card shares a secret to the chip card by using mechanisms called external authentication or challenge/response. Further, it is known that a digital signature secures the download of software but the public keys of all potential senders have to be stored on the hard disk of the computer. Therefore, it is necessary that it can be ensured that the software was not altered on its way through the network and that the software was sent by the owner of the public key. But getting the public key for signature verification must also be done in a secure way, before the download is secure. This requires a chain of certification authorities.

On the other hand, an authentication mechanism is needed to verify that the obtained software component is the most recent issued release of that software. Today, the version control os handled by continuously increasing a version number.

SUMMARY OF THE INVENTION

It is therefore an object of the present invention to provide a method and a system for securely interoperating a first information processing device, in particular a terminal device like a chip card reader, and a second secure information processing device, in particular a portable device like a chip card, where the first device does not yet have an information unit like a software component required for interoperating the first and the second device like providing or controlling access to the second secure device. It is therefore required that the missing information unit is obtained from an other source of information. A particular object of the invention which is strongly related to the above object is that gathering the missing information unit is to be accomplished in a secure manner.

In order to solve the above objects and to avoid the above-mentioned drawbacks of existing mechanisms and systems, the invention proposes that the information unit is provided from the issuer to the first information processing device whereby the information unit is processed by a cryptographic process i.e. for instance encrypted and/or signed by a signature. The required key for the cryptographic process is particularly provided on the second secure information processing device. The information unit is cryptographically reprocessed i.e. for example decrypted and/or its signature verified by using the key. It is emphasized that the information unit can be secured by alternatively using encryption/decryption and signature verification or by using both mechanisms in parallel.

BRIEF DESCRIPTION OF THE DRAWINGS

Preferred embodiments of the present invention will now be described, by way of example only, with reference to the accompanying drawings in which.

DETAILED DESCRIPTION OF THE INVENTION

According to a first preferred embodiment, the information unit is provided from the issuer to the first information processing device whereby the information unit is encrypted by using a first key which is also provided in an encrypted format by using a second key. The second key is provided on the second secure information processing device and interconnecting the first information processing device and the second secure information processing device therefore enables to decrypt the first key by using the second key. By using the decrypted first key, the information unit can also be decrypted.

According to a second preferred embodiment of the invention, the information unit is provided from the issuer to the first information processing device whereby the information unit is signed by using a signature. The signature is provided from the issuer to the first information processing device whereby the signature is generated by using at least one key. Further the at least one key for signature verification is provided on the second secure information processing device. After the first information processing device and the second secure information processing device have been interconnected, the at least one key for signature verification is transferred from the second secure information processing device to the first information processing device. Finally the signature of the information unit is verified by using the at least one key.

It is noteworthy that the information unit can be any set of (pure) data or an executable code like an application program or a hardware driver to run on the second secure device and/or the other device(s), i.e. any kind of information. Further the information unit can serve to run specific functions of the second secure device on the first device or on at least a third device attached to the first device. In particular, the information unit can provide an access control for the second secure device. Further, the second secure information processing device can be any device where the issuer of that device, and of the information unit, can secure that the private key "i" is secure and not alterable, i.e. securely stored on the device. Exemplary devices are chip cards, in particular smart cards, Personal Computers with an according access control, or any other portable devices like laptops, palmtops, organizers, etc. Accordingly, the first information processing device can be any device with which the second secure device can interoperate like a card accepting device, e.g. a card reader, or even a computer with a card accepting device attached thereto.

In particular, according to the invention, the second secure device provides the second key by which the first key has been encrypted and therefore interconnecting the first device and the second device enables firstly to decrypt the first key by using the second key and, secondly, to decrypt the information unit by using the decrypted first key. The basic concept of the invention therefore is t have the private (second) key securely stored on the second secure information processing device what guarantees that this key will remain private i.e., can not be gathered by a third party.

In case of a chip card and a chip card accepting device, the invention particularly enables dynamic secure download and execution of a missing software support, for instance support needed for specific functions of a chip card on a device attached to the chip card acceptance device. The software component can only be decrypted by the usage of a key "T". This key is transmitted in an encrypted form as key "$T_i$" together with the software encrypted with it. Key "$T_i$" can only be decrypted by the chip card knowing the key "I" that was used to encrypt the key "T". The key "I" is stored on the chip card by the issuer at the time of card issuing. One of the advantages of this procedure is that the issuer of the card can secure that the key "I" is a private key insofar as it is guaranteed that the key is not known by others. Further, any laterly required software support for the chip card can be secured by using this key. On the other hand, the session key "T" which maybe will be known by others through transfer to the terminal device, can be changed by the issuer from session to session thus considerably enhancing data security. To make the card decrypt key "$T_i$" using key "I", a command (APDU) is passed to the chip card that was transmitted together with the software module to be decrypted and used. In other words, the chip card which may be controlled by the downloaded software, itself plays a critical role in securing the integrity of the driving software. Insofar, the chip card itself retrieves the key T which has been used to encrypt the downloaded software via decryption of the encrypted key $T_i$. To prevent alteration of the transmitted software module, it is proposed that it will be encrypted or signed with one of the standard algorithms described in the introductory part. The issuer of the software has the required encryption, decryption or signature keys. Instead of requiring the terminal device to store and retrieve the matching decryption key or fetch the matching certificate, the present invention describes a way of using the chip card itself to retrieve that key. The chip card advantageously is the most secure and most convenient way to store the secret decryption key or the certificate or the card issuer. In this way, only software that is certified by the card issuer should be allowed to access the card.

It is emphasized that beyond encryption/decryption the invention can also employ digital signing or digital signature verification for the encryption by using the first key and/or the second key. For this signature case, the described mechanism provides a trusted way to the issuer's public signature key without the requiring complex certificate handling including chains of trust.

The information unit can advantageously be a program module or data to control access to a portable device by the terminal device, the integrity of the information unit hereby playing a rather critical role for data security. Further, the information unit can be an application program which can run either on the portable device or the terminal device or can serve to run specific functions of the portable device on the terminal device or on a second device attached to the terminal device. Also in these cases, data integrity plays a dominant role.

Portable devices like chip cards commonly provide only limited resources for processing data and according limited space for storing data. Therefore, according to another embodiment of the invention, both the decryption of the first key and the decryption of the information unit are accomplished on the terminal device's side.

In order to provide a more powerful and automatically operating system, according to another embodiment of the invention the first device provides a control command (APDU) to the second secure device which initiates or triggers the transfer of the second key to the first device, or initiates or triggers the beginning of decryption of the first key by using the second key. Hereby an operating system or program of the first device advantageously must not know how to decrypt key "$T_i$" and can be freed from performing the decryption procedure. The first device only passes the APDU command to the second secure device. This embodiment enables that the entire procedure proposed by the invention can be performed in the background i.e. not visible to the user whereby in particular the required second key is transferred to the first device without any needed interaction by the user.

In a preferred embodiment of the invention, the encrypted information unit and the encrypted first key are downloaded from a central server, e.g. a server interconnected with the Internet, particularly from a server provided by the issuer of the second secure device. Alternatively, the above mentioned control command can be downloaded, too, from such a server. In view of the continuously increasing meaning of the Internet, such kind of software support via download is a preferred way to obtain a required information unit.

In a further preferred embodiment of the invention, the second key required to decrypt the first key is securely stored on the second secure device at time of its issuing by the issuer. Since the issuer of the card will often be identical with the issuer of the information unit, it is hereby guaranteed that the second key will be compatible with the encryption of the first key.

According to a further embodiment of the invention, a third key can be used for authentication or version control of the underlying information unit. Hereby the second secure device contains a version number and a key "E" which the downloaded information unit accessing the second secure device must know. To prove that the information unit has the matching key "E", a challenge/response mechanism ("external authentication") is used. This allows the issuer of the second secure device by changing the key "E" on that device, in combination with the other steps of the proposed mechanism, to initiate the second secure device and/or the first device to download a new version of the underlying information unit.

Using such a third key, it is possible to realize a further automatization of the proposed mechanism where the first device is initiated to download a new release of the information unit.

The proposed arrangement of the two different key levels enables, in accordance with another preferred embodiment of the invention, that the first key can be randomized between different sessions of interoperating the first and the second device, i.e. the issuer of the second secure device every time can use another random key T to encrypt the information unit with the cryptographic function. Therefore, it is advantageously not compromising the security that the key T is given back from the second device to the first device in a clear form.

It is emphasized again that the method and system according to the invention can be applied to signing and signature verification accordingly.

Figure 1:
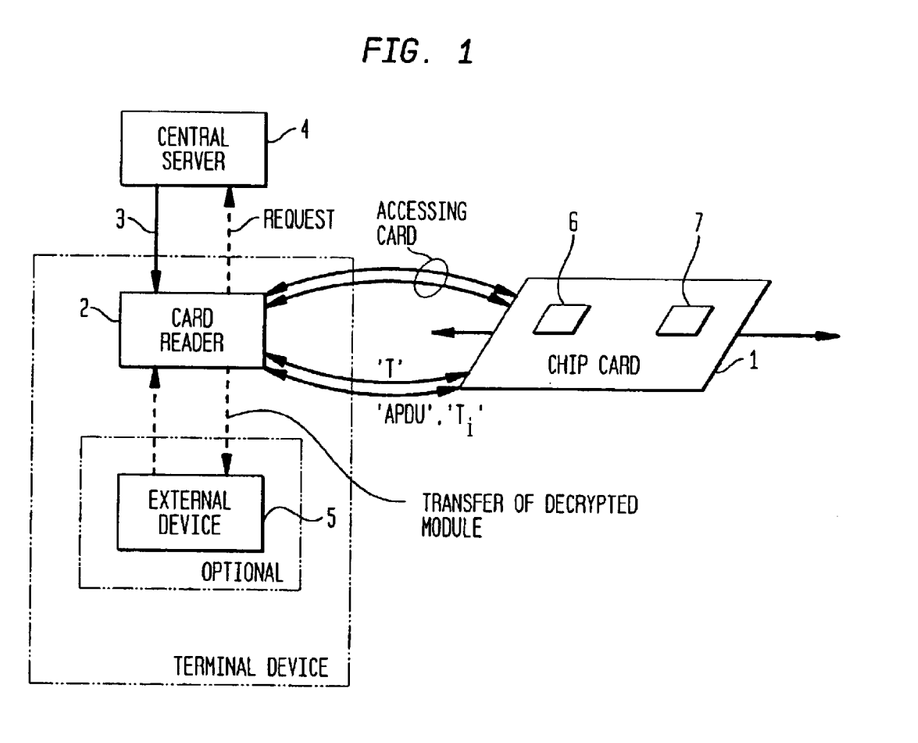
FIG. 1 a schematic view of a preferred embodiment of the invention together with the underlying data flow.

Further features, details and advantages of the present invention will become evident from the following detailed description of embodiments of the invention and the corresponding accompanying drawings, FIG. 1 depicts a scenario where a chip card 1 is inserted in a chip card reader 2 which does not yet have a required software component capable of accessing the chip card 1. Therefore the operating system of the card reader 2 initiates that the missing software component be downloaded 3 from a central server 4 to the card reader 2. In order to validate that the downloaded software component was certified by the issuer and has not been altered in the meantime, in accordance with the invention, the following mechanism is proposed. The issuer's certificate and corresponding private key "I" is stored on the chip card 2 at the time the card is issued. Prior to the software download 3, an encryption with a session key "T" is applied to the underlying software component. The downloaded data therefore contains the cyphered software plus key "$T_i$", i.e. the key "T" encrypted by a key "I", plus a command (APDU) to trigger or to make the chip card 1 decrypt key "$T_i$". The APDU command, when sent to the chip card 1, results in a decryption of the key "$T_i$" to reveal key "T" that was used to encrypt the software component. Due to the above-mentioned combination of two different key levels, the card issuer can every time change key "T" by another random key to encrypt the service with the encryptographic function. Therefore, it is not compromising the security that the key "T" is given back from the chip card 1 to the card reader 2 (terminal device) in clear form. The software module, in this embodiment, is to drive the terminal device 2 to access the chip card 1, but such a software module can also be an application program to run on either the chip card 1 or the terminal device 2 or fulfill specific functions on the terminal device 2 or another (optional) device 5 connected or attached to the terminal device 2. The device 5 can be part of the terminal device and can be any information handling device or system, or only part of such a system like a video display or the like.

Normally the terminal device 2 will be a non-intelligent card accepting device and the device 5 an intelligent card reader. Further, the software module can be a driver to drive the chip card or an instrument to control access to the chip card itself.

It is emphasized that the functionality of the terminal device as proposed by the invention can be implemented by means of common memory and processor hard- and software components.

The underlying encryption/decryption process consists of the following steps. The information unit s is encrypted by using the key "T" and the key "T" is encrypted by using key "I" as follows:

x=enc (s, T);

Ti enc (T, I).

Both "x" and "$T_i$" are transferred from the central server 4 to the card reader 2. The card reader 2 then instructs the chip card 1 to decrypt "$T_i$" using "I":

T=dec (Ti, I).

The chip card 1 returns the decrypted key "T" to the card reader 2. The card reader 2 uses the key "T" to decrypt the information unit "x":

s=dec (x, T).

Figure 2A:
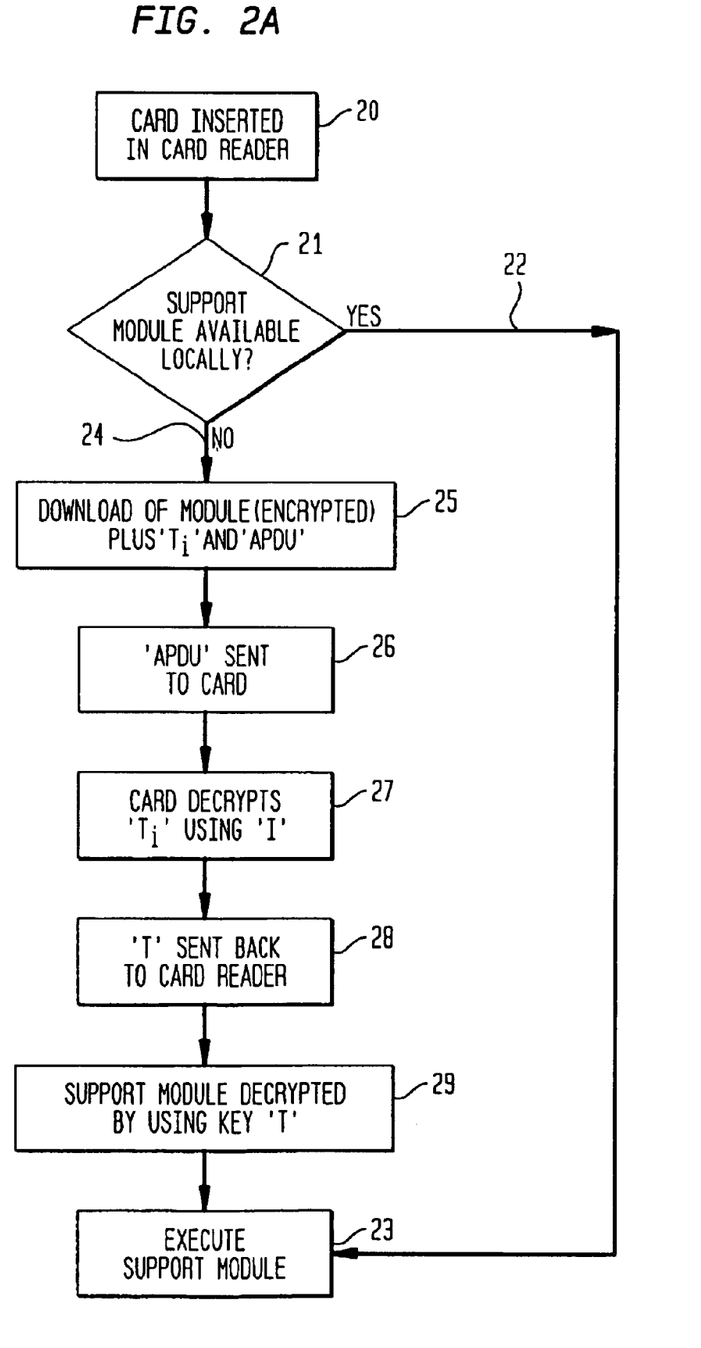
FIG. 2a a flow diagram illustrating a method for encryption/decryption according to the invention.

FIG. 2a depicts a flow diagram illustrating a method for encryption/decryption according to a preferred embodiment of the invention. When the chip card is inserted 20 in the card reader, the card reader firstly checks 21 whether a software support module, e.g. one required to access the chip card or to run a specific function of the chip card on the card reader, or a further device attached to the card reader, is locally available. In case it is 22, it is jumped to step 23 where the available module is executed 23. If the module is not available 24, the card reader builds up an online (telecommunication) connection to the central server and downloads 25 the required module from the server. It should be noted that the download of the module is only an exemplary embodiment i.e. the module can alternatively be provided by the issuer via post mail of a data carrier like a floppy disk. According to the invention, the downloaded module will be in an encrypted format wherein for the encryption an encryption key "T" is used. Together with the support module, the encryption key is downloaded too, but also in an encrypted format "$T_i$" wherein for the encryption a further encryption key "I" is used. Further an 'APDU' control command is downloaded for activating the chip card to participate in the following decryption process as proposed by the invention. As it is commonly used, the overall package (support module+$T_i$+APDU) can be downloaded as one file, e.g. in a compressed format using known compression tools like "WINZIP" or "PKZIP".

Then the 'APDU' control command is sent 26 to the chip card in order to initiate or to trigger the chip card to decrypt 27 the encrypted key "$T_i$" by using key "I". Alternatively the chip card can be initiated to transmit the key "I" to the card reader and the decryption of "$T_i$" performed by the card reader. In case the chip card fulfills the decryption, the decrypted key "T" will be transferred back 28 to the card reader and then the support module be decrypted 29 by an operating system or program available on the card reader, by using the key "T". The resulting decrypted support module then will be executed 23 by the card reader.

In case of an underlying signature/signature verification, the mechanism proposed by the invention consists of the following steps. The information unit "s" is signed by using a signature key "I":

x=sign (s, $I_{priv}$)

Both "x" and "s" are transferred from the central server 4 to the card reader 2. The card reader 2 then gathers the key "I" for signature verification from the chip card 1 and performs the following signature verification operation:

signver (s, x, $I_{pub}$)==OK?

Figure 2B:
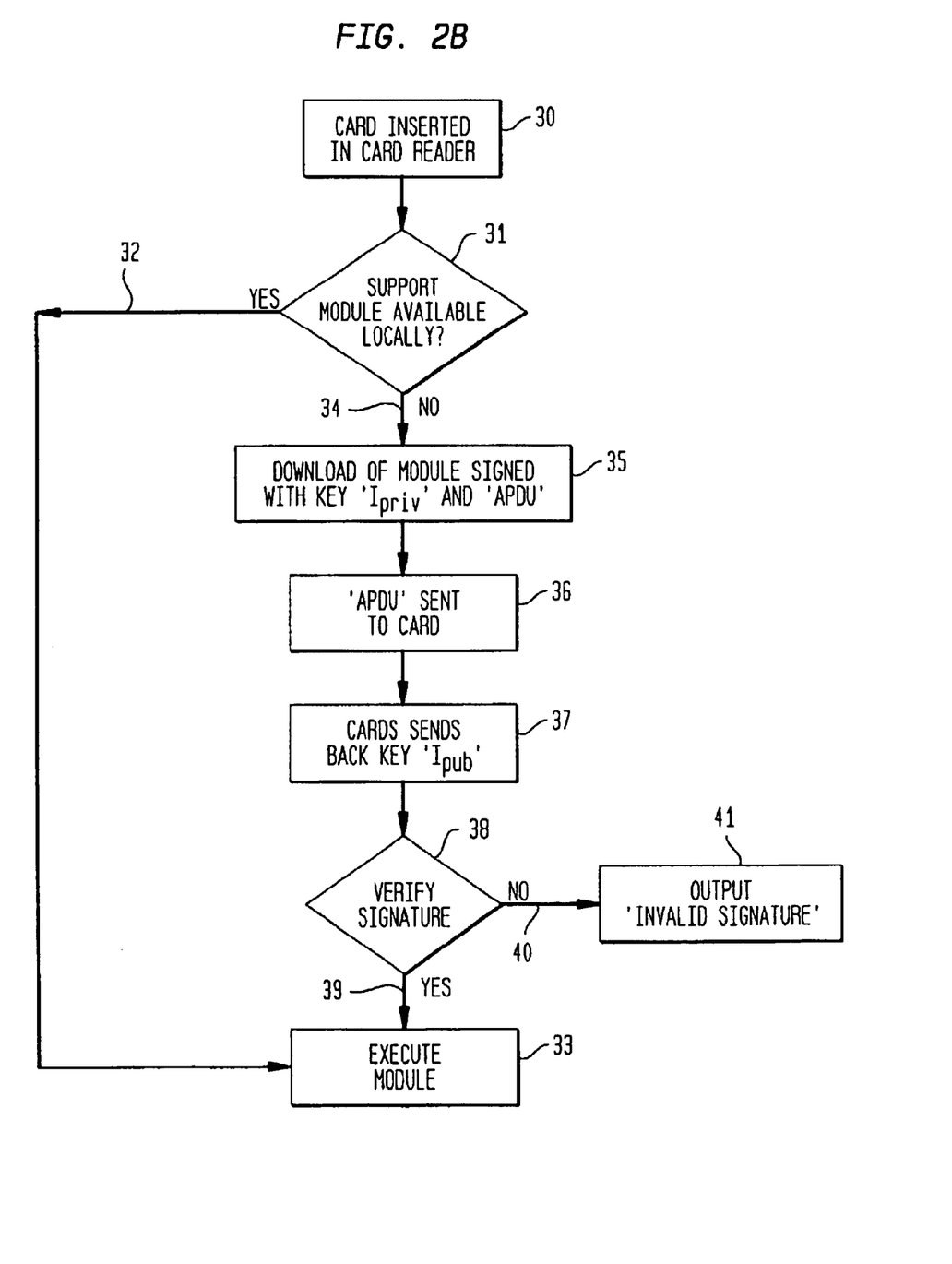
FIG. 2b a flow diagram according to FIG. 2a in a case of a signing/signature verification.

A corresponding flow diagram depicted in FIG. 2b shows the proposed mechanism in case of the signing/signature verification instead of the above described data encryption/decryption. As in FIG. 2a, after the chip card is inserted 30 in the card reader, the card reader checks whether a required support module is locally available 31. If so 32, the module is executed 33. If not 34, the required module and the 'APDU' command are downloaded 35 from the central server whereby the module is signed with a private key "$I_{priv}$". The 'APDU' command is accordingly sent 36 to the chip card in order to initiate or trigger the chip card to send back 37 a public key "$I_{pub}$" which is necessary to verify 38 the signature. According to the teaching of the invention, the required public key "$I_{pub}$" is provided by the chip card itself and transferred to the terminal device at first when having received the 'APDU' command. This key is then used to verify the signature of the downloaded module and in case of a matching signature 39, the software module is executed 33, for instance in order to drive the chip card to execute a particular application either in the chip card or the card reader. If both signatures do not match 40, an error message of the kind 'Invalid Signature' is output by the card reader, e.g. acoustically or by means of a display.

In cases where the card reader has a secure software execution that only allows code to be executed that was validated by the chip card, i.e. it can not only be ensured that the downloaded software was not altered, but also that the software was certified by the issuer of the card, and that the version of the software is appropriate.

Thereupon it is secured that the code can only be executed if it was certified by the issuer of the card, the issuer can make sure that the software accessing the card does not make any operations that can insecure the system like sending data to somebody else or logging data.

For a version control, the following step can be added to the sequence of steps depicted in either FIG. 2a or FIG. 2b:

External authentication with key "E" in order to verify that the version of the software module matches the smart card.

Authentication is herein regarded as any process through which one proves and verifies certain information. A chip card commonly uses external authentication to establish the identity of the terminal. This is done by ensuring that the terminal device shares a secret with the chip card.

An external authentication starts with the chip card wondering about the terminal's identity and sending a challenge—for example a random 8-byte sequence—to the terminal whose identity is being questioned. The terminal receiving the challenge encrypts it with its secret, a particular key, and sends back the encrypted result. The chip card now decrypts the encrypted message using the key it knows the terminal possesses if it is authentic.

If the message decrypts satisfactorily, i.e. the decrypted challenge is identical to the challenge originally sent by the chip card, then the chip card knows that the terminal possesses a particular key and this establishes its identity.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A method for securely handling an information unit by a first information processing device (2) interoperating with a second secure information processing device (1), whereby the information unit is provided by an issuer, the method comprising the steps:

transmitting (3, 25, 35) the information unit, from the first issuer to the first information processing device (2), the information unit being processed by a cryptographic process;

providing at least one key for the cryptographic process on the second secure information processing device (1);

the first information processing device (i) receiving the at least one key from the second information processing device, and (ii) cryptographically reprocessing (29, 38) the information unit by using the at least one key;

providing (3, 25, 35) the information unit from the issuer to the first information processing device (2), the information unit being encrypted by using at least a first key;

providing the first key from the issuer to the first information processing device (2), the first key being encrypted by using at least a second key;

providing the at least one second key on the second secure information processing device (1); and wherein at least a third key is provided for external authentication and/or release control of the respective information unit.

2. The method according to claim 1, comprising:

providing (3, 25, 35) the information unit from the issuer to the first information processing device (2), the information unit being signed by using a signature key;

providing the signature from the issuer to the first information processing device (2), the signature being generated by using at least one key, providing the at least one key for signature verification on the second secure information processing device (1);

interconnecting the first information processing device (2) and the second secure information processing device (1);

transferring the at least one key for signature verification from the second secure information processing device to the first information processing device; and verifying the signature of the information unit by using the at least one key.

3. The method according to claim 2, wherein the first information processing device (2) provides a control command (26, 36) to the second secure information processing device (1) to initiate decryption of the at least first key by using the at least second key and/or to initiate transferring the signature key for signature verification from the second secure device to the first device.

4. The method according to claim 3, wherein the encrypted information unit, the encrypted first key, and/or the signature key, and/or the generated signature, and/or the control command are downloaded (25, 35) from a central server (4).

5. The method according to claim 2, wherein the second key and/or the key for signature verification are/is securely stored on the second secure device (1) at time of its issuing by the issuer.

6. The method according to claim 2, wherein the at least first key and/or the signature key are/is randomized between different sessions of providing the information unit from the issuer to the first device (2).

7. The method according to claim 1, wherein the decrypted at least first key is transferred to the first information processing device (2) and the information unit is decrypted (29) on side of the first device (2).

8. The method according to claim 1, wherein the first device (2) is initiated to gather a new release of the information unit from the issuer, depending on the respective status of the third key.

9. The method according to claim 8, wherein the new release of the information unit is downloaded from an internet server (4) provided by the issuer.

10. The method according to claim 1, wherein the first information processing device (2) is a terminal device, and the second secure information processing device (1) is a portable device.

11. The method according to claim 10, wherein the terminal device is a chip card reader and the portable device is a chip card.

12. A system for securely handling an information unit, comprising a first information processing device (2) interoperating with a second secure information processing device (1), the information unit being provided by an issuer, comprising:
the first device (2) comprising
a storage for storing the information unit, encrypted by using at least a first key, and a storage for storing the first key, encrypted by using at least a second key; and
the second secure device (1) comprising
a storage (6) for storing the at least one second key, and processing means for decrypting the at least first key by using the at least second key;
the first device further comprising (i) means for receiving the at least one key from the second information processing device, and (ii) means for decrypting the information unit by using the at least one key; and
wherein the first device (2) and/or the second secure device (1) comprises a storage (6) for storing at least a third key for external authentication and/or release control of the information unit and processing means (7) for processing the third key.

13. The system according to claim 12, wherein
the first device (2) comprises
a storage for storing a signature for the information unit;
the second secure device (I) comprises
a storage (6) for storing at least one signature key;
providing means for verifying the signature of the information unit by using the at least one signature key.

14. The system according to claim 13, wherein the second secure device (1) comprises means to initiate decryption of the at least first key by using the at least second key and/or means to initiate transfer of the signature key for signature verification from the second secure device to the first device.

15. The system according to claim 12, wherein the second secure device (1) provides an access control by means of the information unit.

16. The system according to claim 12, wherein the second secure device (1) comprises a processor to make specific functions of the second secure device usable/accessible on the first device or on at least a third device (5) attached to the first device.

17. The system according to claim 12, wherein the first device (2) comprises processing means for decrypting (29) the information unit by use of the decrypted at least first key.

18. The system according to claim 12, wherein the first device (2) comprises means to download the encrypted information unit, the encrypted first key, and/or the generated signature, and/or the control command, from a central server (4).

19. The system according to claim 18, wherein the central server (4) comprises a randomizer for randomizing the at least first key and/or the signature between different sessions of providing the information unit from the issuer to the first device.

20. The system according to claim 12, wherein the second secure device (1) comprises a non-erasable storage to store the second key and/or the signature key at time of its issuing.

21. The system according to claim 12, wherein the first device (2) comprises means to initiate download of a new release of the information unit, depending on the respective status of the third key.

22. The system according to claim 12, wherein the first information processing device (2) is a terminal device, and the second secure information processing device (1) is a portable device.

23. The system according to claim 22, wherein the terminal device is a chip card reader and the portable device is a chip card.

24. A chip card (1) for securely handling an information unit by interoperating with an information handling terminal device (2), comprising a storage (6) for storing an at least one key for a cryptographic process, and means for transmitting the at least one key to said handling terminal device to enable said device to cryptographically process an information unit received by said device from an issuer;
wherein a processor (7) runs specific functions on the terminal device (2, 5) or on at least a second device attached to the terminal device (2, 5);
further comprising means for transferring of at least one second key to the terminal device (2, 5) and/or means for decrypting of the at least first key by using the at least second key and/or means to initiate transfer of the signature key for signature verification:
wherein is non-erasble storage (6) stores the second key and/or the signature key at time of its issuing; and
further comprising a storage (6) for storing at least a third key external authentication and/or release control of the information unit and processing means (7) for processing the third key.

25. The chip card according to claim 24, wherein processing means (7) performing an access control is controlled by an information unit.

26. The chip card according to claim 24, wherein said processing means (7) initiates download of a new release of the information unit, depending on the respective status of the third key.

27. A chip card accepting device (2), for securely handling an information unit by interoperating with a chip card (1), comprising:

a storage for storing the information unit;

means for receiving at least one first key from a chip card, means for cryptographically reprocessing the information unit by using the at least one first keys;

means for receiving at least one second key for decrypting the first key; and a storage for storing at least a third key for external authentication and/or release control of the information unit and processing means for processing the third key.

28. The chip card accepting device according to claim 27, further comprising means for verifying a digital signature.

29. The chip card accepting device according to claim 27, further comprising:

means for decrypting the information unit by using at least one key, means for verifying a digital signature; and means for downloading the encrypted information unit, the at least one key and the digital signature from a central server (4).

30. The chip card accepting device according to claim 29, further comprising means to initiate download of a new release of the information unit, depending on the respective status of the third key.

31. A program storage device readable by machine, tangibly embodying a program of instructions executable by the machine to perform method steps for securely handling an information unit by a first information processing device (2) interoperating with a second secure information processing device (1), whereby the information unit is provided by an issuer, said method steps comprising:

transmitting (3, 25, 35) the information unit, in an encrypted form, from the issuer to the first information processing device (2), the information unit being processed by a cryptographic process;

providing at least one key for the cryptographic process on the second secure information processing device (1);

the first information processing device (i) receiving the at least one key from the second information processing device, and (ii) cryptographically reprocessing (29, 38) the information unit by using the at least one key;

providing (3, 25, 35) the information unit from the issuer to the first information processing device (2), the information unit being encrypted by using at least a first key;

providing the first key from the issuer to the first information processing device (2), the first key being encrypted by using at least a second key:

providing the at least one second key on the second secure information processing device (1); and wherein at least a third key is provided for external authentication and/or release control of the respective information unit.

32. A program storage device according to claim 31, said method steps further comprising:

providing (3, 25, 35) the information unit from the issuer to the first information processing device (2), the information unit being signed by using a signature key;

providing the signature from the issuer to the first information processing device (2), the signature being generated by using at least one key;

providing at least one key for signature verification on the second secure information processing device (1);

interconnecting the first information processing device (2) and the second secure information processing device (1);

transferring the at least one key for signature verification from the second secure information processing device to the first information processing device to the first information processing device; and verifying the signature of the information unit by using the at least one key.

* * * * *

UNITED STATES PATENT AND TRADEMARK OFFICE
CERTIFICATE OF CORRECTION

PATENT NO. : 6,892,301 B1
DATED : May 10, 2005
INVENTOR(S) : Uwe Hansmann et al.

It is certified that error appears in the above-identified patent and that said Letters Patent is hereby corrected as shown below:

Column 10,
Line 57, "key, prividing" should read -- key; providing --.

Column 12,
Line 55, "wherein is non-erasble" should read -- wherein a non-erasable --.

Column 13,
Line 19, "key," should read -- key; --.

Column 14,
Line 12, "key:" should read -- key; --.

Signed and Sealed this

Eleventh Day of April, 2006

JON W. DUDAS
*Director of the United States Patent and Trademark Office*